United States Patent
Ruiters et al.

(10) Patent No.: US 10,233,982 B2
(45) Date of Patent: Mar. 19, 2019

(54) OPERATING A CLUTCH IN A MOTOR VEHICLE

(71) Applicant: GKN Automotive Ltd., Redditch, Worcestershire (GB)

(72) Inventors: Volker Rene Ruiters, Siegburg (DE); Andreas Langhanki, Duisburg (DE)

(73) Assignee: GKN Automotive Ltd., Redditch, Worcestershire (GB)

( * ) Notice: Subject to any disclaimer, the term of this patent is extended or adjusted under 35 U.S.C. 154(b) by 50 days.

(21) Appl. No.: 15/527,032

(22) PCT Filed: Nov. 19, 2014

(86) PCT No.: PCT/EP2014/074958
§ 371 (c)(1),
(2) Date: May 16, 2017

(87) PCT Pub. No.: WO2016/078701
PCT Pub. Date: May 26, 2016

(65) Prior Publication Data
US 2017/0321765 A1     Nov. 9, 2017

(51) Int. Cl.
*F16D 48/02* (2006.01)
*F16D 48/06* (2006.01)

(52) U.S. Cl.
CPC ........... *F16D 48/02* (2013.01); *F16D 48/066* (2013.01); *F16D 2048/0245* (2013.01);
(Continued)

(58) Field of Classification Search
CPC .................. F16D 48/02; F16D 48/066; F16D 2500/5016; F16D 2500/5014;
(Continued)

(56) References Cited

U.S. PATENT DOCUMENTS 8,583,334 B2 * 11/2013 Martin .................. F16D 48/066
476/67
8,827,865 B2 * 9/2014 Naqvi .................. B60W 20/00
477/5
(Continued)

FOREIGN PATENT DOCUMENTS

DE      19857707 A1    6/1999
DE      19934853 A1    2/2001
(Continued)

OTHER PUBLICATIONS

International Search Report and Written Opinion for PCT/EP2014/074958 dated Jul. 27, 2015 (13 pages; with English translation).

*Primary Examiner* — David J Hlavka
(74) *Attorney, Agent, or Firm* — Bejin Bieneman PLC

(57) ABSTRACT

A clutch cylinder in a hydraulic pressure system can be charged with a controlled rotational speed of a pump to deliver hydraulic fluid into the clutch cylinder until a biting point of the clutch is reached and exceeded and a motor current of the pump has attained a predetermined minimum value. On the basis of a profile of the controlled rotational speed, a first volume of the hydraulic fluid delivered into the clutch cylinder by the pump up is determined until the minimum value is attained. The value of the first volume can be reduced by a predetermined amount to a second volume, which can be used for clutch processes during vehicle operation, wherein the second volume is delivered into the clutch cylinder, with a high rotational speed of the pump, such that the clutch is filled such that the biting point of the clutch is not quite reached.

17 Claims, 2 Drawing Sheets

(52) U.S. Cl.
CPC ............... *F16D 2500/1026* (2013.01); *F16D 2500/3025* (2013.01); *F16D 2500/5014* (2013.01); *F16D 2500/5016* (2013.01)

(58) Field of Classification Search
CPC ..... F16D 2048/0245; F16D 2500/1026; F16D 2500/3025
See application file for complete search history.

(56) References Cited

U.S. PATENT DOCUMENTS

| | | | |
|---|---|---|---|
| 2010/0298089 A1 | 11/2010 | Sah | |
| 2011/0278129 A1* | 11/2011 | Gorius | ................ F16D 48/066 192/85.01 |

FOREIGN PATENT DOCUMENTS

| | | |
|---|---|---|
| DE | 10137581 C1 | 1/2003 |
| EP | 1903240 A2 | 3/2008 |
| EP | 2233766 A1 | 9/2010 |
| EP | 2386774 A1 | 11/2011 |

* cited by examiner

OPERATING A CLUTCH IN A MOTOR VEHICLE

CROSS-REFERENCE TO RELATED APPLICATIONS

This application is a national stage of, and claims priority to, Patent Cooperation Treaty Application No. PCT/EP2014/074958 filed on Nov. 19, 2014, which application is hereby incorporated herein by reference in its entirety.

The present disclosure relates to a method for operating a clutch of a motor vehicle.

The method can be used, in particular, in all hydraulically actuated clutches. These include clutches in hang-on systems (for example, boosters), clutches in torque vectoring systems (for example, Twinster, BMW-QMVH), clutches in disconnect systems (PTU with a friction disk system), clutches in change-speed transmissions (Volvo2Speed) and clutches in locking differentials (transverse lock in RDU).

The clutch as a rule comprises a plurality of clutch linings and a clutch spring, and is connected to a hydraulic pressure system which has at least one pump, a clutch cylinder and a clutch piston. In particular, at least one valve is provided between the pump and the clutch cylinder. The hydraulic pressure system is suitable for delivering a hydraulic fluid into the clutch cylinder via the pump and optionally the valve and for moving the clutch piston in a targeted manner, with the result that the clutch linings are brought into contact with one another counter to a force of the clutch spring. At what is known as a grip point of the clutch, an air gap is overcome and the clutch linings are in contact with one another, the force of the clutch piston and the force of the clutch spring just canceling one another out, with the result that the clutch linings bear against one another without a pressing force or without a substantial pressing force. A further increase in the pressure in the hydraulic pressure system then directly results in a provision of a torque capacity of the clutch, that is to say the clutch actually transmits a (predefined) torque, for example from a drive unit to a transmission.

In motor vehicles, clutches, such as clutches in double clutch transmissions, which are actuated automatically by way of an (electronic) control unit are increasingly used. In the case of an actuation of this type, the precise knowledge of the grip point is of decisive significance for the quality of the clutch actuation, in particular the knowledge about the time and/or the situation of the hydraulic pressure system, at which the grip point is present; in particular, only a low torque may be transmitted by way of the clutch before the actual transmission of a torque from a drive unit to a transmission or to the rotatable components of a motor vehicle which are connected to it (transmission shafts, lateral shafts, longitudinal shaft, etc.), with the result that a synchronization of the rotational speeds (firstly on the drive unit side, secondly on the transmission side) can take place. Accordingly, the clutch linings have to be arranged in a defined manner with respect to one another, with the result that a desired (low) torque is transmitted for a defined time duration until the synchronization has taken place. The clutch linings are brought into contact beyond the grip point only after this, with the result that the torque of the drive unit can then be transmitted completely to the transmission.

In order to reach said grip point starting from a completely open clutch, the clutch cylinder has to be filled with a hydraulic fluid. In order that said filling operation proceeds rapidly, the filling pressure can be set to a high value (from the beginning). By way of the high filling pressure, a great volumetric flow can be set in the hydraulic pressure system, with the result that the clutch cylinder is filled rapidly and the grip point is reached in a short time, starting from the open clutch. There is the risk here, however, that, as a result of the high filling pressure during filling of the clutch cylinder, the clutch piston ultimately exerts a force on the clutch linings which is greater than the opposed force of the clutch spring, which leads to the clutch linings, although they are in contact, being pressed onto one another, as a result of which the clutch already has a torque capacity (grip point exceeded). This is undesirable, however, for a regulated method of operation of the clutch which is used in a motor vehicle, because driving comfort is impaired on account of noise and jolt-like accelerations.

If, in contrast, a comparatively lower filling pressure is set, the filling of the clutch cylinder and therefore the reaching of the grip point can take too much time, which likewise results in comfort losses during shifting in a motor vehicle or possibly can lead to failed shifting operations.

EP 1 903 240 A2 has already disclosed a method for reaching a grip point, in which method the filling pressure is controlled in such a way that filling of the clutch cylinder which is as rapid as possible is achieved, it being intended for exceeding of the grip point to be avoided. Said process is carried out iteratively, the filling pressure which has been determined by sensor most recently in each case being used for controlling the operation of the clutch. Said method requires a complex and therefore expensive sensor evaluation unit, however, the time period until the grip point is reached reliably (but not exceeded) being relatively long as a result of the iterative measurement and control.

Disclosed herein is a solution to the problems depicted in relation to the prior art and, in particular, i.e., a method for operating and/or determining/setting exactly and/or monitoring a grip point of a clutch of a motor vehicle, which method allows the grip point to be reached as rapidly as possible and does not make it necessary to use further components.

A solution is presented in a method in accordance with the features of claim 1. Further advantageous embodiments of the method are specified in the dependent claims. It is noted that the features which are described individually in the dependent claims can be combined with one another in any desired, technologically appropriate way and define further embodiments. Moreover, the features which are specified in the patent claims will be stated more precisely and described in greater detail in the description, further embodiments of the invention being shown.

This disclosure relates to a method for operating a clutch of a motor vehicle, the clutch having a plurality of clutch linings and a clutch spring, and being connected to a hydraulic pressure system. The hydraulic pressure system has at least one pump, a clutch cylinder and a clutch piston, the hydraulic pressure system being suitable for delivering a hydraulic fluid (for example, an oil) into the clutch cylinder via the pump and for moving the clutch piston, with the result that the clutch linings are brought into contact with one another counter to a force of the clutch spring. At the grip point of the clutch, an air gap is overcome and the clutch linings are brought into contact; a further increase of the pressure in the hydraulic pressure system would directly bring about a provision of a torque capacity of the clutch (that is to say, a transmission of a torque, for example from a drive unit to a transmission via the clutch). The method comprises at least the following steps:

a) filling the clutch cylinder at a controlled rotational speed of the pump in order to deliver the hydraulic fluid into the clutch cylinder, until a grip point of the clutch is reached and exceeded, and a motor current of the pump has reached a predefined minimum value;

b) determining a first volume of the hydraulic fluid which is delivered into the clutch cylinder by way of the pump until the minimum value is reached, on the basis of a profile of the controlled rotational speed in step a);

c) reducing the value of the first volume by a predefined magnitude, with the result that a second volume is defined;

d) use of the second volume for clutch operations during operation of the motor vehicle, the second volume being delivered into the clutch cylinder at a high rotational speed of the pump, with the result that the clutch is filled to such an extent that the grip point of the clutch is not quite yet reached.

A clutch which is suitable for the described method is, for example, a booster clutch (hang-on, clutch is seated on a lateral shaft):

volume of the clutch cylinder up to the grip point approximately 5.2 ml (milliliters)

volume of the clutch cylinder up to 40 bar/1500 Nm (Newton meters): approximately 8 ml (including air gap)

air gap: approximately 0.7 mm (millimeter)

maximum motor rotational speed of the pump: approximately 5000 rpm (revolutions per minute)

pump volume per revolution: approximately 0.1 ml (milliliter)

Starting from a pressureless or unfilled clutch, the clutch cylinder is filled with the hydraulic fluid until the clutch linings are brought into contact with one another. The clutch cylinder is filled further beyond the grip point until the (electric) motor current of the pump has reached a predefined minimum value. In particular, the minimum value of the (electric) motor current of the pump is between 8 and 16, preferably between 8 and 12 A (for example, at the end of step a)).

The profile of the rotational speed of the pump is monitored and/or recorded until the minimum value is reached, with the result that the first volume which is delivered into the clutch cylinder can be calculated precisely (step b)).

A predefined magnitude can already be determined from preliminary tests and/or calculations using clutches of this type, which predefined magnitude is subtracted from the first volume, with the result that a second volume is defined (step c)). Said predefined magnitude is dependent on the installed components in the clutch and can be defined for a clutch of a defined type without problems for a person skilled in said art, for example, in a test operation (before the installation in a vehicle).

The second volume is the volume which is delivered into the clutch cylinder via the pump, the grip point of the clutch then not quite yet being reached (step d)).

If the grip point of the clutch has not yet quite been reached, both an initial air gap between the clutch linings can still exist, and (light) contact of the clutch linings can already be present, with the result that a low torque is already transmitted. Because a low torque is required, for example for synchronization, the clutch moves directly slightly beyond the initial air gap, in order that said specific torque is transmitted as rapidly as possible. Said torque is dependent on the application. For example, in the case of a synchronization, the transmitted torque must not be higher than a certain value, in order that the driver does not discern any jolt, but at the same time should be high enough, in order that the synchronization takes place rapidly.

Advantageously, the method can be carried out without a pressure sensor being used, and without it being necessary for recourse to be made to the determined values of a pressure sensor.

In the present method, the clutch linings are brought into contact via the grip point in such a way that there is a constant gradient of the torque characteristic curve of the clutch at least if the minimum value is reached (by the motor current). Said region of a constant gradient of the torque characteristic curve is called a regulating range of a clutch. In said regulating range, the torque gradient, that is to say the gradient of the torque characteristic curve, is dependent in practice only on the coefficient of friction between the clutch linings, and is therefore largely constant. For this reason, a defined filling degree of the clutch cylinder can be determined (first volume) with sufficient accuracy by way of the motor current of the pump, in the case of which filling degree there is a defined pressure in the clutch cylinder, and/or in the case of which filling degree a defined torque is transmitted. A second volume can be defined in this way, by way of the previously determined predefined magnitude.

Said second volume can then be used for further filling operations of the clutch. The second volume can be delivered into the clutch cylinder at an increased rotational speed of the pump, with the result that rapid reaching of the grip point is realized.

According to one particularly advantageous embodiment of the method, steps a) to c) are carried out during an initial commissioning of the clutch, the clutch and the hydraulic pressure system being operated without leakage. An initial air gap of the clutch can be determined in this way.

"Initial commissioning" means herein that the clutch is loaded with pressure for the first time in a controlled manner after the connection to a hydraulic pressure system and after the installation, for example in a motor vehicle. In particular, there is therefore no operation of the motor vehicle here, but rather, for example, there is an end of line test (EOL test) in an assembly or workshop area for motor vehicles. In particular, the clutch, the pressure system and/or the motor vehicle are/is operated to this end under controlled conditions in a test range.

"Without leakage" means herein, in particular, that the hydraulic pressure system is operated under controlled conditions, with the result that a leakage is reliably prevented during said filling operation. During operation of a motor vehicle, for example, the individual components of a pressure system are supplied with energy via the electronic on-board power system. Here, for example, the valves which are arranged in the feed line of the hydraulic fluid between the clutch cylinder and the pump may not open completely, with the result that a leakage occurs (the hydraulic fluid is therefore not transferred completely into the clutch cylinder). Under controlled conditions, all components are then operated in such a way and, in particular, valves are energized in such a way, that leakage-free operation is ensured (that is to say, the valves are open completely, for example). The first volume which is delivered into the clutch cylinder until the predefined minimum value is reached can then be determined precisely from the rotational speed of the pump (steps a) and b)). The second volume which is determined by way of step c) then results directly in the initial air gap of the clutch, that is to say the air gap which is present during initial commissioning of the clutch (without wear of the friction linings or the like).

A (current or actual) leakage of the clutch during operation of the motor vehicle is preferably determined for a current operating point in the knowledge of the initial air gap, comprising the following processes:

i. carrying out of step a) during initial commissioning of the clutch, the clutch and the hydraulic pressure system being operated without a leakage, and, when the minimum value of the motor current is reached and held, a first rotational speed of the pump being determined;

ii. carrying out of step a) during operation of the motor vehicle at a current or actual operating point, a second rotational speed of the pump being determined when the minimum value of the motor current is reached and held, and the current or actual leakage of the clutch being determined for the current or actual operating point from the difference of the first rotational speed and the second rotational speed.

The current or actual leakage at a current or actual operating point of the clutch is dependent, in particular, on one or more current or actual parameters, for example the temperature of the hydraulic fluid, tolerances of the valves and the valve bores, tolerances of the pump and, depending on the hydraulic system, tolerances of an orifice which can be installed in the hydraulic system. In this way, the situation can therefore be defined which is currently present at the time said process is being carried out. The leakage at other operating points of the clutch can also be determined computationally, starting from said first determined (current or actual) leakage.

In particular, during the operation of the motor vehicle, an air gap of the clutch is determined, comprising the following processes:

iii. determining the leakage of the clutch at a present operating point in accordance with processes i. and ii. (for example, by means of the use of the leakage which has already been determined, and consideration of the temperature and other parameters);

iv. carrying out of steps a) to c) during operation of the motor vehicle, and determining a current second volume;

v. reducing of the value of the current second volume (which is fed in in a defined time period) by the determined leakage of the clutch (for the defined time period), with the result that the air gap can be determined from the difference.

In this way, the situation of the air gap which is currently present at the time said process is being carried out can therefore be defined, in particular if in each case the current or actual parameters are determined and/or considered.

According to one preferred embodiment, the (current) absolute wear of the clutch linings is determined during the operation of the motor vehicle or during a follow-up time (that is to say, for example, after an ignition of the motor vehicle is switched off); comprising the following part steps:

1. determining the current air gap in accordance with process v.;

2. forming the difference of the initial air gap and the air gap which is determined in accordance with part step 1, the (current) absolute wear being determined from the difference.

The absolute wear is the wear/the abrasion of the clutch linings since initial commissioning of the clutch, which wear is determined at a current time.

In particular, the current absolute wear of the clutch linings is determined during the operation of the motor vehicle or during a follow-up time; comprising the following sub-steps:

(1) carrying out of steps a) and b) during operation of the motor vehicle or during a follow-up time at a current operating point, and determining a current first volume;

(2) reducing of the value of the current first volume by the current leakage (see, in particular, the method variant having the processes i. and ii.), and determining a corrected current first volume;

(3) forming of a difference of the corrected current first volume and the first volume (which was determined during initial commissioning of the clutch without leakage), the current absolute wear of the clutch linings being determined from the difference.

In particular, the current relative wear of the clutch is determined during the operation of the motor vehicle or during a follow-up time, comprising the following steps:

I. carrying out steps a) and b) during operation of the motor vehicle or during a follow-up time at a first operating point, and determining of a relative first volume; and subsequently II. renewed carrying out of steps a) and b) during operation of the motor vehicle or during a follow-up time, and determining of a subsequent relative first volume;

III. forming of a difference of the subsequent relative first volume and the relative first volume, the (current) relative wear of the clutch linings being determined from the difference.

In particular, the progress of the wear can thus be determined at all times. In this way, the course of the wear over the service life of the clutch can be followed and, if a certain wear has been reached or exceeded, a notification can be generated via a control unit, which notification indicates the state of the clutch.

In particular, steps a) and b) (optionally also c)) are carried out after an ignition of the motor vehicle is switched off, with the result that, during the subsequent renewed commissioning of the motor vehicle, there is a current value for the second volume, and the clutch can be operated directly by way of step d).

The presently disclosed subject matter also includes a motor vehicle having a drive unit, a transmission and at least one clutch, the clutch having a plurality of clutch linings and a clutch spring, and being connected to a hydraulic pressure system which has a pump, a clutch cylinder and a clutch piston, the hydraulic pressure system being suitable for delivering a hydraulic fluid into the clutch cylinder via the pump and for moving the clutch piston, with the result that the clutch linings are brought into contact with one another counter to a force of the clutch spring. Furthermore, the motor vehicle has a control unit which is set up and configured in such a way that it can operate the clutch in accordance with a method which is proposed here.

It is proposed, in particular, that the control unit is set up and configured in such a way that the wear of the clutch linings is determined regularly and is transmitted to the control unit; it being possible for at least the (current) absolute wear and/or the (current) relative wear of the clutch linings to be called up via the control unit.

In the following text, the disclosed subject matter and the technical environment will be described in greater detail using the figures. It is to be noted that the figures show embodiments of the invention to which they are not restricted, however. Identical designations are also used for identical objects in the figures, in which, diagrammatically:

Figure 1:
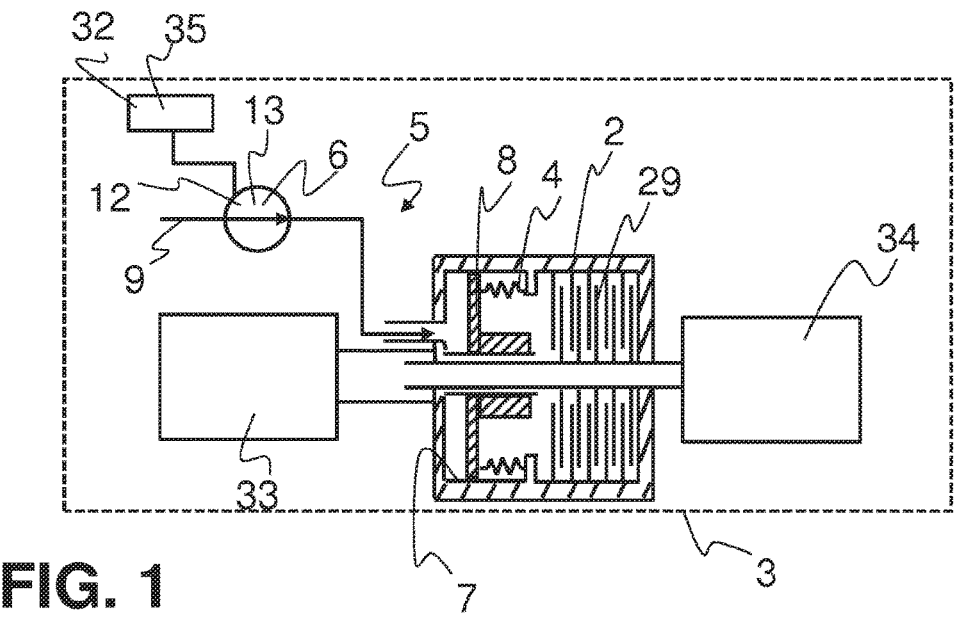
FIG. 1 shows a motor vehicle having a clutch.

FIG. 1 shows a motor vehicle 3 having a drive unit 33, a transmission 34 and a (single) clutch 2. The clutch 2 has a plurality of clutch linings 29 and a clutch spring 4, and is connected to a hydraulic pressure system 5 which has at least one pump 6, a clutch cylinder 7 and a clutch piston 8, the hydraulic pressure system 5 being suitable for delivering a hydraulic fluid 9 into the clutch cylinder 7 via the pump 6 and for moving the clutch piston 8, with the result that the clutch linings 29 are brought into contact with one another counter to a force of the clutch spring 4. When the clutch linings 29 are brought into contact with one another, a torque of the drive unit 33 can be transmitted to the transmission 34.

The hydraulic pressure system 5 is connected to a control unit 35. The control unit 35 regulates and monitors the rotational speed 12 and the motor current 13 of the pump 6 or the motor which drives the pump 6. The delivered pressure 11 in the clutch 2 is set by way of the control unit 35. Furthermore, the motor vehicle 3 comprises an ignition 32 which is connected here to the control unit 35. The drive unit 33 (for example, an internal combustion engine) is switched on and off via the ignition 32.

Figure 2:
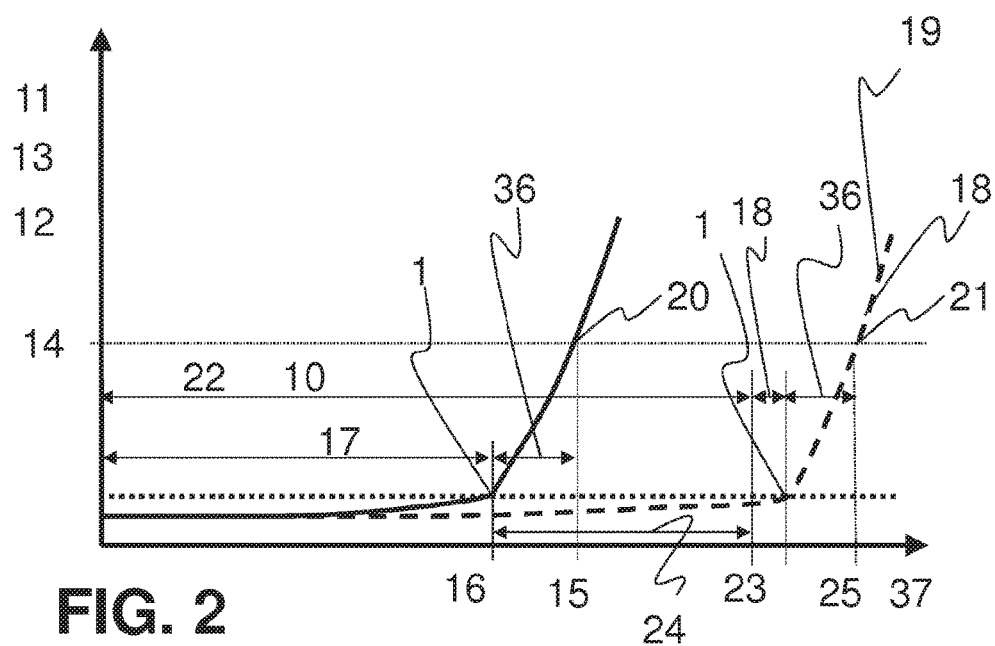
FIG. 2 shows a graph including a plot of torque profile.

FIG. 2 shows a diagram in which the profile of the torque (proportionally with respect to the pressure 11 and the motor current 13) is plotted along the ordinate against the degree of filling or the filled volume 37 of the clutch 2 along the abscissa. It can be seen that the torque gradient (the gradient of the curve) is virtually constant after the grip point 1 is reached. It can be seen, furthermore, that, in the case of a second volume 16, 23, the air gap 10, 17, 22 of the clutch 2 is overcome and the clutch linings 29 are brought into contact. From this point, the curve rises steeply (that is to say, the values for the motor current 13, the torque and the pressure 11). A further increase in the pressure 11 in the pressure system 5 beyond the grip point 1 would then directly bring about a provision of a torque of the clutch 2, that is to say the clutch 2 would transmit a torque of a drive unit 33 to a transmission 34.

FIG. 2 clarifies the change of the air gap 10 as a result of wear for a clutch 2. Here, steps a) to c) are carried out during initial commissioning of the clutch 2, the clutch 2 and the hydraulic pressure system 5 being operated without leakage. In this way, an initial air gap 17 of the clutch 2 can be determined. The clutch cylinder 7 is filled at a controlled rotational speed 12 of the pump 6 for delivering the hydraulic fluid 9 into the clutch cylinder 7, until the grip point 1 of the clutch 2 is reached and exceeded, and a motor current 13 of the pump 6 has reached a predefined minimum value 14 (step a)). On the basis of the profile of the controlled rotational speed 12 in step a), a first volume 15 of the hydraulic fluid 9 which is delivered into the clutch cylinder 7 by way of the pump 6 until the minimum value 14 is reached is determined (step b)). Said value of the first volume 15 is reduced by a predefined magnitude 36, with the result that a second volume 16 is defined (step c)). The second volume 16 corresponds to the initial air gap 17, directly before the grip point 1 is reached.

By knowing the initial air gap 17, a current leakage 18 of the clutch 2 during operation of the motor vehicle 3 can be determined for a current operating point 19. To this end, in a step i., step a) is carried out during initial commissioning of the clutch 2, the clutch 2 and the hydraulic pressure system 5 being operated without a leakage, a first rotational speed 20 of the pump 6 being determined when the minimum value 14 of the motor current 13 is reached and held. Subsequently, in a process ii., step a) is carried out during operation of the motor vehicle 3 at a current operating point 19, a second rotational speed 21 of the pump 6 being determined when the minimum value 14 of the motor current 13 is reached and held, the current leakage 18 of the clutch 2 being determined for the current operating point 19 from the difference of the first rotational speed 20 and the second rotational speed 21.

Furthermore, a current air gap 22 of the clutch 2 can be determined during the operation of the motor vehicle 3, the current leakage 18 of the clutch 2 being determined in a process iii. at a present current operating point 19 in accordance with processes i. and ii. (either use of the current leakage which has already been determined and possibly consideration of the temperature and other parameters or new calculation of the current leakage 18). In a further process iv., steps a) to c) are carried out during operation of the motor vehicle 3, and a current second volume 23 is determined. In a process v., the value of the current second volume 23 (which is fed in in a defined time period) is reduced by the determined current leakage 18 of the clutch 2 (for the defined time period), with the result that the current air gap 22 can be determined from the difference.

During the operation of the motor vehicle 3 or during a follow-up time, the current absolute wear 24 of the clutch linings 29 is determined, the current air gap 22 in accordance with step v. being determined in a step 1. In a further step 2., a difference is formed from the initial air gap 17 and the current air gap 22, the current absolute wear 24 being determined from the difference.

Figure 3:
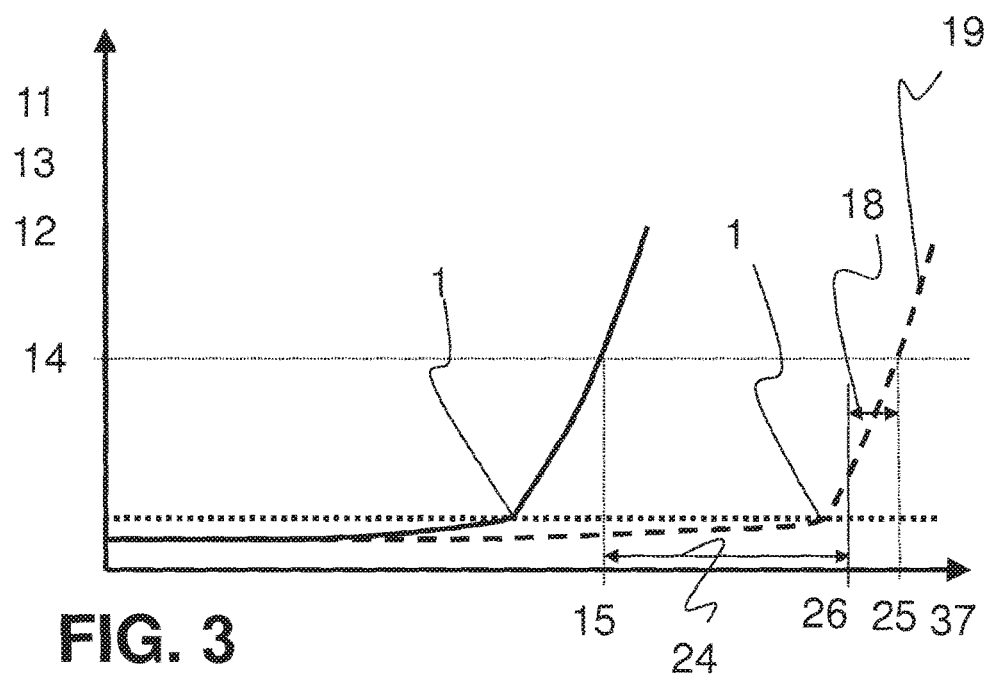
FIG. 3 shows a further graph for clarifying the possible determination of the absolute wear.

FIG. 3 shows that the current absolute wear 24 of the clutch linings 29 can also be determined differently. In a sub-step (1), steps a) and b) are carried out during operation of the motor vehicle 3 or during a follow-up time at a current operating point 19, and a current first volume 25 is determined. In a further sub-step (2), the value of the current first volume 25 is reduced by the current leakage 18, and a corrected current first volume 26 is determined. In a sub-step (3), the difference of the corrected current first volume 26 and the first volume 15 (which was determined during initial commissioning of the clutch 2 without leakage) is formed, the current absolute wear 24 of the clutch linings 29 being determined from the difference.

Figure 4:
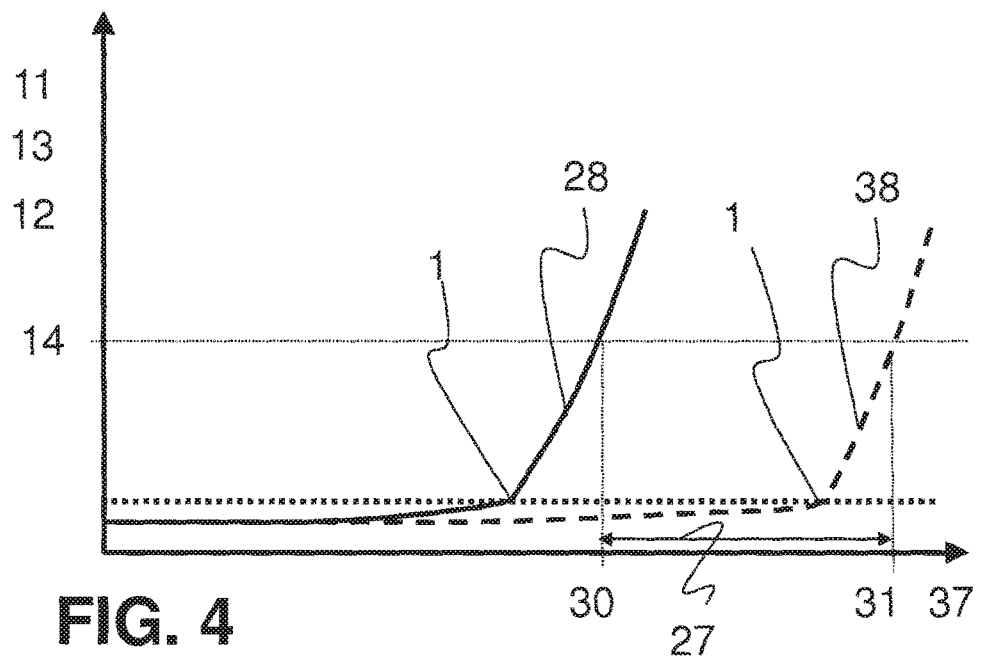
FIG. 4 shows a graph for clarifying the possible determination of the relative wear.

FIG. 4 shows that the current relative wear 27 of the clutch 2 is determined during the operation of the motor vehicle 3 or during a follow-up time. Here, in a procedure I., steps a) and b) are carried out during operation of the motor vehicle 3 or during a follow-up time at a first operating point 28, and a relative first volume 30 is determined. Subsequently, in a procedure II., steps a) and b) are again carried out during operation of the motor vehicle 3 or in a follow-up time at a second operating point 38, and a subsequent relative first volume 31 is determined. In a procedure III., a difference is formed from the subsequent relative first volume 31 and the relative first volume 30, the current relative wear 27 of the clutch linings 29 being determined from the difference.

The invention claimed is:

1. A method for operating a clutch of a motor vehicle, the clutch having a plurality of clutch linings and a clutch spring, and being connected to a hydraulic pressure system that has a pump, a clutch cylinder and a clutch piston, the hydraulic pressure system being arranged for delivering a hydraulic fluid into the clutch cylinder via the pump and for moving the clutch piston, so that the clutch linings are brought into contact with one another counter to a force of the clutch spring, an air gap being overcome at a grip point of the clutch and the clutch linings being brought into contact; wherein a further increase in a pressure in the pressure system would directly bring about a provision of a torque capacity of the clutch, the method comprising the following steps:

a) filling the clutch cylinder at a controlled rotational speed of the pump in order to deliver the hydraulic fluid into the clutch cylinder until the grip point of the clutch is reached and exceeded and a motor current of the pump has reached a predefined minimum value;
b) determining a first volume of the hydraulic fluid that is delivered into the clutch cylinder by way of the pump until the minimum value is reached, on the basis of a profile of the controlled rotational speed;
c) reducing of a value of the first volume by a predefined magnitude, whereby a second volume is defined; and
d) using the second volume for clutch operations during operation of the motor vehicle, the second volume being delivered into the clutch cylinder at a high rotational speed of the pump, so that the clutch is filled to such an extent that the grip point of the clutch is not quite yet reached.

2. The method of claim 1, wherein steps a) to c) are carried out during an initial commissioning of the clutch, and the clutch and the hydraulic pressure system are operated without leakage and an initial air gap of the clutch is thereby determined.

3. The method of claim 2, further comprising determining a leakage of the clutch during operation of the motor vehicle for an operating point based on the initial air gap by steps comprising:
   i) carrying out step a) during initial commissioning of the clutch, the clutch and the hydraulic pressure system being operated without leakage and, when the minimum value of the motor current is reached and held, determining a first rotational speed of the pump; and
   ii) then carrying out step a) during operation of the motor vehicle at an operating point, a second rotational speed of the pump being determined when the minimum value of the motor current is reached and held, the leakage of the clutch being determined for the operating point from the difference of the first rotational speed and the second rotational speed.

4. The method of claim 3, further comprising determining the initial air gap of the clutch during the operation of the motor vehicle by steps comprising:
   iii) determining the leakage of the clutch at a present operating point according to steps i) and ii);
   iv) carrying out steps a) to c) during operation of the motor vehicle, and determining a second volume; and
   v) reducing the value of the second volume by the determined current leakage of the clutch, whereby the air gap can be determined from the difference.

5. The method of claim 4, further comprising determining an absolute wear of the clutch linings during the operation of the motor vehicle or during a follow-up time, by steps comprising:
   1) determining the air gap in accordance with step v); and
   2) forming the difference of the initial air gap and the air gap to determine the absolute wear.

6. The method of claim 3, further comprising determining the absolute wear of the clutch linings during the operation of the motor vehicle or during a follow-up time, by steps comprising:
   (1) carrying out of steps a) and b) during operation of the motor vehicle or during a follow-up time at an operating point, and determining the first volume;
   (2) subtracting the leakage from the first volume to determine a corrected first volume; and
   (3) determining the absolute wear of the clutch linings from a difference of the corrected first volume and the first volume.

7. The method of claim 1, further comprising determining relative wear of the clutch during the operation of the motor vehicle or during a follow-up time, by steps comprising:
   I) carrying out of steps a) and b) during operation of the motor vehicle or during a follow-up time at a first operating point, and determining of a relative first volume;
   II) subsequently re-carrying out steps a) and b) during operation of the motor vehicle or during a follow-up time, and determining of a subsequent relative first volume; and
   III) determining the relative wear of the clutch linings according to a difference of the subsequent relative first volume and the relative first volume.

8. The method of claim 1, wherein steps a) and b) are carried out after an ignition of the motor vehicle is switched off so that, during subsequent renewed commissioning of the motor vehicle, there is a current value for the second volume and the clutch can be operated directly by using the second volume for clutch operations during operation of the motor vehicle.

9. A motor vehicle having a drive unit, a transmission and a clutch, the clutch having a plurality of clutch linings and a clutch spring and being connected to a hydraulic pressure system that has a pump, a clutch cylinder and a clutch piston, the hydraulic pressure system arranged to deliver a hydraulic fluid into the clutch cylinder via the pump and to move the clutch piston so that the clutch linings are brought into contact with one another counter to a force of the clutch spring; the motor vehicle having an electronic control unit (ECU) configured to operate the clutch by
   a) filling the clutch cylinder at a controlled rotational speed of the pump in order to deliver the hydraulic fluid into the clutch cylinder until a grip point of the clutch is reached and exceeded and a motor current of the pump has reached a predefined minimum value;
   b) determining a first volume of the hydraulic fluid that is delivered into the clutch cylinder by way of the pump until the minimum value is reached, on the basis of a profile of the controlled rotational speed;
   c) reducing of a value of the first volume by a predefined magnitude, whereby a second volume is defined; and
   d) using the second volume for clutch operations during operation of the motor vehicle, the second volume being delivered into the clutch cylinder at a high rotational speed of the pump, so that the clutch is filled to such an extent that the grip point of the clutch is not quite yet reached.

10. The motor vehicle of claim 9, wherein the ECU is further configured to carry out steps a) to c) during an initial commissioning of the clutch, and the clutch and the hydraulic pressure system are operated without leakage and an initial air gap of the clutch is thereby determined.

11. The motor vehicle of claim 10, wherein the ECU is further configured to determine a leakage of the clutch during operation of the motor vehicle for an operating point based on the initial air gap by steps comprising:
   i) carrying out step a) during initial commissioning of the clutch, the clutch and the hydraulic pressure system being operated without leakage and, when the minimum value of the motor current is reached and held, determining a first rotational speed of the pump; and
   ii) then carrying out step a) during operation of the motor vehicle at an operating point, a second rotational speed of the pump being determined when the minimum value of the motor current is reached and held, the leakage of the clutch being determined for the operating point from the difference of the first rotational speed and the second rotational speed.

12. The motor vehicle of claim 11, wherein the ECU is further configured to determine the initial air gap of the clutch during the operation of the motor vehicle by steps comprising:
   iii) determining the leakage of the clutch at a present operating point according to steps i) and ii);
   iv) carrying out steps a) to c) during operation of the motor vehicle, and determining a second volume; and
   v) reducing the value of the second volume by the determined current leakage of the clutch, whereby the air gap can be determined from the difference.

13. The motor vehicle of claim 12, wherein the ECU is further configured to determine an absolute wear of the clutch linings during the operation of the motor vehicle or during a follow-up time, by steps comprising:
   1) determining the air gap in accordance with step v); and
   2) forming the difference of the initial air gap and the air gap to determine the absolute wear.

14. The motor vehicle of claim 11, wherein the ECU is further configured to determine the absolute wear of the clutch linings during the operation of the motor vehicle or during a follow-up time, by steps comprising:
   (1) carrying out of steps a) and b) during operation of the motor vehicle or during a follow-up time at an operating point, and determining the first volume;
   (2) subtracting the leakage from the first volume to determine a corrected first volume; and
   (3) determining the absolute wear of the clutch linings from a difference of the corrected first volume and the first volume.

15. The motor vehicle of claim 9, wherein the ECU is further configured to determine relative wear of the clutch during the operation of the motor vehicle or during a follow-up time, by steps comprising:
   I) carrying out of steps a) and b) during operation of the motor vehicle or during a follow-up time at a first operating point, and determining of a relative first volume;
   II) subsequently re-carrying out steps a) and b) during operation of the motor vehicle or during a follow-up time, and determining of a subsequent relative first volume; and
   III) determining the relative wear of the clutch linings according to a difference of the subsequent relative first volume and the relative first volume.

16. The motor vehicle of claim 9, wherein the ECU is further configured to carry out steps a) and b) after an ignition of the motor vehicle is switched off so that, during subsequent renewed commissioning of the motor vehicle, there is a current value for the second volume and the clutch can be operated directly by using the second volume for clutch operations during operation of the motor vehicle.

17. The motor vehicle of claim 9, wherein the ECU is further configured to store periodically for retrieval determined wear of the clutch linings.

* * * * *